United States Patent
Kang et al.

(10) Patent No.: US 11,456,526 B2
(45) Date of Patent: Sep. 27, 2022

(54) ANTENNA UNIT, ANTENNA SYSTEM AND ELECTRONIC DEVICE

(71) Applicant: SPREADTRUM COMMUNICATIONS (SHANGHAI) CO., LTD., Shanghai (CN)

(72) Inventors: Kai Kang, Shanghai (CN); Shusheng Guo, Shanghai (CN); Jiewei Lai, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/979,703

(22) PCT Filed: Mar. 26, 2019

(86) PCT No.: PCT/CN2019/079607
§ 371 (c)(1),
(2) Date: Sep. 10, 2020

(87) PCT Pub. No.: WO2020/155346
PCT Pub. Date: Aug. 6, 2020

(65) Prior Publication Data
US 2021/0050656 A1 Feb. 18, 2021

(30) Foreign Application Priority Data
Jan. 31, 2019 (CN) .......................... 201910101624.5

(51) Int. Cl.
*H01Q 1/22* (2006.01)
*H01Q 1/36* (2006.01)
(Continued)

(52) U.S. Cl.
CPC ............. *H01Q 1/362* (2013.01); *H01Q 1/243* (2013.01); *H01Q 1/38* (2013.01); *H01Q 3/22* (2013.01); *H04B 1/40* (2013.01)

(58) Field of Classification Search
CPC .. H01Q 1/22; H01Q 1/38; H01Q 3/22; H01Q 5/30; H01Q 9/04; H01Q 11/08;
(Continued)

(56) References Cited

U.S. PATENT DOCUMENTS 7,557,772 B2 * 7/2009 De Flaviis ........... H01Q 1/2216
340/10.1
10,074,904 B2 9/2018 Tomonari et al.
(Continued)

FOREIGN PATENT DOCUMENTS

| CN | 1347169 A | 5/2002 |
|----|-----------|--------|
| CN | 2838057 Y | 11/2006 |

(Continued)

OTHER PUBLICATIONS

International Search Report for International Application No. PCT/CN2019/079607; dated Aug. 5, 2019.
(Continued)

*Primary Examiner* — Blane J Jackson
(74) *Attorney, Agent, or Firm* — Cantor Colburn LLP (57) ABSTRACT

An antenna unit, an antenna system and an electronic device are provided. The antenna unit includes: a helical antenna with a three-dimensional structure, wherein the helical antenna is disposed on an edge region of a carrier board, and includes at least one turn of helical coil, wherein each of the at least one turn of helical coil includes multiple helical segments that are not in a same plane, and the multiple helical segments are respectively disposed in multiple layers of the carrier board. The antenna system includes a carrier board, a first antenna array and a second antenna array,
(Continued)

wherein the first antenna array is disposed in a middle region of the carrier board and includes multiple patch units, the second antenna array includes at least one above antenna unit, and the helical antenna of the antenna unit is disposed at the edge region of the carrier board.

19 Claims, 7 Drawing Sheets

(51) Int. Cl.
    *H01Q 1/24*     (2006.01)
    *H01Q 1/38*     (2006.01)
    *H01Q 3/22*     (2006.01)
    *H04B 1/40*     (2015.01)

(58) Field of Classification Search
    CPC ...... H01Q 21/06; H01Q 21/065; H01Q 11/02; H01Q 21/22; H01Q 1/36; H04B 1/40
    See application file for complete search history.

(56) References Cited

U.S. PATENT DOCUMENTS

| | | | |
|---|---|---|---|
| 11,018,408 B2 * | 5/2021 | Hong | H01Q 1/24 |
| 11,024,971 B2 * | 6/2021 | Hong | H01Q 9/045 |
| 2002/0044102 A1 | 4/2002 | Yokoshima et al. | |
| 2012/0154252 A1 | 6/2012 | Nakatani | |
| 2013/0257668 A1 | 10/2013 | Rao et al. | |
| 2015/0214622 A1 | 7/2015 | Tenno | |
| 2017/0373396 A1 * | 12/2017 | Kato | H01Q 7/00 |
| 2018/0351240 A1 * | 12/2018 | Kato | H01Q 1/243 |
| 2019/0027827 A1 | 1/2019 | Won et al. | |
| 2019/0257933 A1 * | 8/2019 | Nath | H01Q 21/064 |
| 2019/0312347 A1 * | 10/2019 | Edwards | H01Q 1/523 |
| 2020/0052403 A1 * | 2/2020 | Hong | H01Q 9/045 |

FOREIGN PATENT DOCUMENTS

| | | | | |
|---|---|---|---|---|
| CN | 201336360 Y | 10/2009 | | |
| CN | 201417818 A | 3/2010 | | |
| CN | 101777698 A | 7/2010 | | |
| CN | 102484319 A | 5/2012 | | |
| CN | 102800932 A | 11/2012 | | |
| CN | 103094675 A | 5/2013 | | |
| CN | 103367917 A | 10/2013 | | |
| CN | 104882667 A | 9/2015 | | |
| CN | 204809410 U | 11/2015 | | |
| CN | 206628599 U | 11/2017 | | |
| CN | 207542406 U | 6/2018 | | |
| CN | 208028205 U | 10/2018 | | |
| GB | 2503930 A | * | 1/2014 | ............ H01Q 1/243 |
| KR | 20110125716 A | 11/2011 | | |
| WO | WO-9926316 A1 | * | 5/1999 | ............ H01Q 1/242 |
| WO | 2016031454 A1 | 3/2016 | | |

OTHER PUBLICATIONS

CNIPA First Office Action for corresponding CN Application No. 201910101624.5; dated Jan. 29, 2021.

* cited by examiner

ANTENNA UNIT, ANTENNA SYSTEM AND ELECTRONIC DEVICE

CROSS-REFERENCE TO RELATED APPLICATIONS

This is the U.S. national stage of International Application No. PCT/CN2019/079607, filed on Mar. 26, 2019, which claims the benefit of priority to Chinese Patent Application No. 201910101624.5, filed on Jan. 31, 2019, and entitled "ANTENNA UNIT, ANTENNA SYSTEM AND ELECTRONIC DEVICE", the entire disclosure of which is incorporated herein by reference.

TECHNICAL FIELD

The present disclosure generally relates to antenna technology field, and more particularly, to an antenna unit, an antenna system and an electronic device.

BACKGROUND

The 5-th Generation (5G) new radio standard defines multiple millimeter wave frequency bands. For example, a sum of frequency bands N257 and N258 in China, the United States, Japan, Korea, Europe and other regions is 24.25 GHz to 29.5 GHz, and a bandwidth relative to its center frequency is about 20%. If specified frequency bands in different regions of the world need to be compatible in a system, a wideband antenna is required. However, it is difficult for existing antennas to cover a wide frequency band, thereby resulting in inability of mobile terminals to be used globally, which brings inconvenience to users' travel.

In addition, as miniaturized antennas, microstrip antennas are widely used in various miniaturized devices in fields of mobile terminals, radars and aerospace. With the further miniaturization of smart terminals, higher requirements are put forward on a size of the microstrip antennas. The size of existing microstrip antennas is still difficult to meet industrial design requirements of miniaturization and slimness of mobile terminals, and it also increases cost of integrated antenna arrays and a volume and an area of packaged chips.

SUMMARY

To increase working bandwidth of an antenna, reduce a size of the antenna and reduce a volume and an area of an Antenna in Package (AiP) structure, embodiments of the present disclosure provide an antenna unit, including a helical antenna with a three-dimensional structure, wherein the helical antenna is disposed on an edge region of a carrier board, and includes at least one turn of helical coil, wherein each of the at least one turn of helical coil includes a plurality of helical segments that are not in a same plane, and the plurality of helical segments are respectively disposed in a plurality of layers of the carrier board.

Optionally, the carrier board includes at least two metal layers and a non-conductive dielectric layer between the two metal layers, and each of the at least one turn of helical coil includes a first helical segment, a second helical segment, a third helical segment and a fourth helical segment which are connected in series, wherein the first helical segment and the third helical segment are respectively disposed in the at least two metal layers along a direction parallel to a plane of the carrier board, and the second helical segment and the fourth helical segment penetrate through the non-conductive dielectric layer along a thickness direction of the carrier board to electrically connect the first helical segment and the third helical segment.

Optionally, the carrier board includes a plurality of non-conductive dielectric layers and a plurality of metal layers alternately stacked along the thickness direction of the carrier board, the helical antenna includes a plurality of turns of helical coil, a plurality of first helical segments of the plurality of turns of helical coil are disposed in a same metal layer or different metal layers, and a plurality of second helical segments of the plurality of turns of helical coil are disposed in a same metal layer or different metal layers.

Optionally, each of the first helical segment and the third helical segment includes a radiation arm, and each of the second helical segment and the fourth helical segment includes a through hole or a via filled with a conductive material, wherein two ends of the through hole or the via of the second helical segment are electrically connected to the radiation arm of the first helical segment and the radiation arm of the third helical segment, and an end of the through hole or the via of the fourth helical segment is electrically connected to the radiation arm of the third helical segment.

Optionally, the first helical segment further includes at least one solder pad which is electrically connected to at least one end of the corresponding radiation arm, the third helical segment further includes two solder pads which are electrically connected to two ends of the corresponding radiation arm, two ends of the through hole or the via of the second helical segment are electrically connected to one solder pad of the first helical segment and one solder pad of the third helical segment, and an end of the through hole or the via of the fourth helical segment is electrically connected to the other solder pad of the third helical segment.

Optionally, the first helical segment and the third helical segment are curved or linear.

Optionally, the first helical segment and the third helical segment are in a shape of a trigonometric function curve or a logarithmic function curve.

Optionally, an angle between projections of the first helical segment and the third helical segment on the plane of the carrier board is an acute angle.

Optionally, the antenna unit works in an axial radiation mode, or a mixed radiation mode of a normal radiation mode and an axial radiation mode, wherein in the axial radiation mode, the antenna unit has largest radiation intensity in an axial direction of the helical antenna, and in the normal radiation mode, the antenna unit has largest radiation intensity in a direction perpendicular to the axial direction of the helical antenna.

Optionally, the helical antenna includes a plurality of turns of helical coil, and parameters of the plurality of turns of helical coil satisfy following conditions:

$$3/4 < C/\lambda_0 < 4/3, S \approx \lambda_0/4, N \geq 3,$$

where C is circumference of a projection of each turn of helical coil on a plane perpendicular to an axis of the helical antenna, S is an interval between the turns of helical coil, N is the number of the plurality of turns of helical coil, and $\lambda_0$ is working wavelength of the helical antenna.

Optionally, the helical antenna includes a plurality of turns of helical coil, and the plurality of turns of helical coil have different helical radii.

Optionally, a change trend of the helical radii of the plurality of turns of helical coil includes: the helical radii of the helical coils in two end regions of the carrier board being smaller than the helical radii of the helical coils in a middle region of the carrier board.

Optionally, a first antenna array is disposed in a middle region of the carrier board, and includes a plurality of patch units, and a maximum value of the helical radii of the plurality of turns of helical coil is smaller than or equal to a size of one patch unit.

Optionally, an axial direction of the helical antenna is parallel to a normal direction of a boundary of the carrier board in the edge region where the helical antenna is located.

Optionally, the carrier board further includes one or more ground planes, wherein the one or more ground planes cover a middle region of the carrier board to expose the edge region of the carrier board, the one or more ground planes are electrically connected via contact holes that penetrate the carrier board along a thickness direction of the carrier board, a notch retracted toward the middle region of the carrier board is formed on the one or more ground planes near the edge region of the carrier board, and a portion of the helical antenna is disposed in the carrier board exposed by the notch.

Optionally, the antenna unit further includes a microstrip feed disposed in a middle region of the carrier board, wherein a feed end of the microstrip feed is electrically connected to a first end of the helical antenna, and a second end of the helical antenna is a free end configured to radiate signals.

Embodiments of the present disclosure further provide an antenna system, which includes a carrier board, a first antenna array and a second antenna array, wherein the first antenna array is disposed in a middle region of the carrier board and includes a plurality of patch units, the second antenna array includes at least one above antenna unit, and the helical antenna of the antenna unit is disposed at the edge region of the carrier board.

Optionally, the plurality of patch units are disposed along a direction parallel to a plane of the carrier board, a maximum gain of radiation of the patch units points to a direction perpendicular to the plane of the carrier board, an axis of the helical antenna of the at least one antenna unit is arranged in the direction parallel to the plane of the carrier board, and a maximum gain of radiation of the antenna unit points to an axial direction of the helical antenna.

Optionally, the second antenna array includes a plurality of antenna units arranged in a one-dimensional array on the carrier board, a radiation beam distribution range of the first antenna array includes a sector between −60° and 60° on a radiation plane perpendicular to the plane of the carrier board, and a radiation beam distribution range of the second antenna array includes a sector between 60° and 120° on the radiation plane perpendicular to the plane of the carrier board.

Optionally, the antenna system further includes a transceiver chip electrically connected to the first antenna array and the second antenna array and configured to receive and transmit signals in a preset frequency range.

Optionally, the transceiver chip includes a transceiver peripheral circuit and a radio frequency integrated circuit chip.

Optionally, the transceiver chip is configured to receive and transmit millimeter wave signals.

Optionally, the carrier board includes a package substrate.

Optionally, the antenna system further includes a Printed Circuit Board (PCB), wherein the first antenna array and the second antenna array are disposed on a first surface of the package substrate, the transceiver chip is disposed on a second surface of the package substrate, and the package substrate carrying the first antenna array, the second antenna array and the transceiver chip is integrated on the PCB.

Optionally, the antenna system further includes a PCB, wherein the first antenna array is disposed on a first surface of the package substrate, the transceiver chip is disposed on a second surface of the package substrate, the package substrate carrying the first antenna array and the transceiver chip is integrated on a first region of the PCB, and the second antenna array is integrated on a second region of the PCB.

Optionally, the antenna system further includes a PCB, wherein the second antenna array is disposed on a first surface of the package substrate, the transceiver chip is disposed on a second surface of the package substrate, the package substrate carrying the second antenna array and the transceiver chip is integrated on a first region of the PCB, and the first antenna array is integrated on a second region of the PCB.

Optionally, the carrier board includes a PCB, and the first antenna array, the second antenna array and the transceiver chip are integrated on the PCB.

Embodiments of the present disclosure further provide an electronic device including the above antenna system.

Optionally, the electronic device includes a mobile terminal applicable to a 5G new radio standard.

Embodiments of the present disclosure may provide following advantages.

The antenna unit provided in the embodiments of the present disclosure includes a helical antenna with a three-dimensional structure. The helical antenna is disposed in a plurality of layers of the carrier board rather than in a same plane, which reasonably utilizes a horizontal space and a vertical space of the carrier board, greatly reduces a volume and an area of the antenna unit, so as to meet process design requirements of miniaturization and slimness of mobile terminals.

Further, each of the at least one turn of helical coil includes a first helical segment, a second helical segment, a third helical segment and a fourth helical segment which are connected in series, wherein the first helical segment and the third helical segment are respectively disposed in the at least two metal layers along a direction parallel to a plane of the carrier board, and the second helical segment and the fourth helical segment penetrate through the non-conductive dielectric layer along a thickness direction of the carrier board, that is, the first helical segment and the third helical segment are two planar helical antennas, and the second helical segment extends in a longitudinal direction for electrically connecting the two planar helical antennas. In this way, not only the helical antenna has a three-dimensional structure, but also the planes of the two metal layers are greatly used to set planar helical segments with preset length and preset shapes to realize wideband impedance matching of the helical antenna.

Further, the carrier board includes a plurality of non-conductive dielectric layers and a plurality of metal layers alternately stacked in a thickness direction thereof, the helical antenna includes a plurality of turns of helical coil, a plurality of first helical segments of the plurality of turns of helical coil are disposed in a same metal layer or different metal layers, and a plurality of second helical segments of the plurality of turns of helical coil are disposed in a same metal layer or different metal layers. Therefore, design of segments of each helical coil is flexible in order to adjust performance of the helical antenna.

Further, the first helical segment and the third helical segment may be in a shape of a continuous and smooth function curve such as a trigonometric function or a logarithmic function, which is beneficial to achieve impedance matching between the helical antenna and the transceiver chip.

Further, the antenna unit can work in an axial radiation mode as an edge antenna to cover a space outside a maximum working angle of a main antenna array, so that it can work with the main antenna array to cover the entire sector. Alternatively, the antenna unit can work in a mixed radiation mode of the normal radiation mode and the axial radiation mode, so that it not only can cover the space outside the maximum working angle of the main antenna array, but also a size of the antenna unit is reduced, which reaches a balance between performance of the antenna and the size of the antenna.

Further, the working mode of the antenna unit is determined by structural parameters of the helical antenna, such as a helical circumference of each turn of the helical coil, an interval between the turns of helical coil, and the number of the turns of the helical coil. Specifically, the helical antenna may work in the axial radiation mode or the mixed radiation mode by setting $3/4 < C/\lambda_0 < 4/3$, $S \approx \lambda_0/4$, and $N \geq 3$.

Further, the plurality of turns of helical coil included in the helical antenna may have different helical radii, and a change trend of the helical radii of the plurality of turns of helical coil can be adjusted to adjust wideband impedance matching and a radiation direction gain of the helical antenna.

The antenna system provided in the embodiments of the present disclosure includes a first antenna array and a second antenna array. The first antenna array is arranged in the middle region of the carrier board as a main antenna. The second antenna array includes the antenna unit provided in the embodiments of the present disclosure which is disposed at the edge region of the carrier board as an edge antenna, where the edge antenna covers the space outside the maximum working angle of the main antenna, so that it can cooperate with the main antenna to cover the entire sector. The antenna system further includes a carrier board and a transceiver chip, where the carrier board may include a package substrate or a PCB. In practice, various ways can be used to form a package structure of the antenna, and various ways can also be used to integrate the first antenna array, the second antenna array and the transceiver chip on the PCB.

DETAILED DESCRIPTION

In order to make the above objectives, features and beneficial effects of the present disclosure more obvious and understandable, specific embodiments of the present disclosure are described in detail below with reference to accompanying drawings. The various embodiments in the disclosure are described in a progressive manner. Each embodiment focuses on its differences from other embodiments, and the same or similar parts between the various embodiments can be referred to each other.

Antennas used in a communication system may include a main antenna and an edge antenna. The main antenna may be disposed in a middle region of the substrate, and the edge antenna may be disposed in an edge region of the substrate. The main antenna and the edge antenna cooperate with each other to complete signal transmission and reception.

Figure 1A:
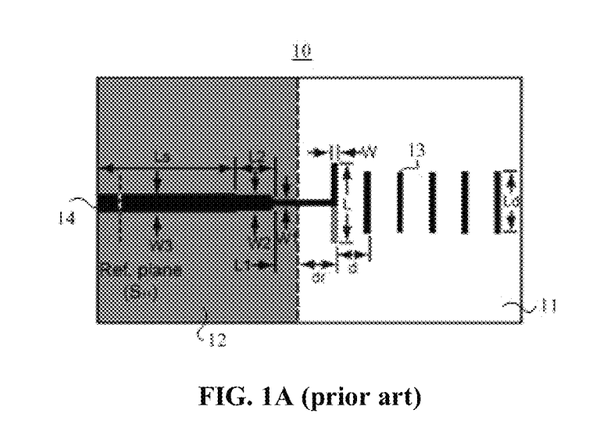
FIG. 1A is a diagram of an edge antenna 10.
Figure 1B:
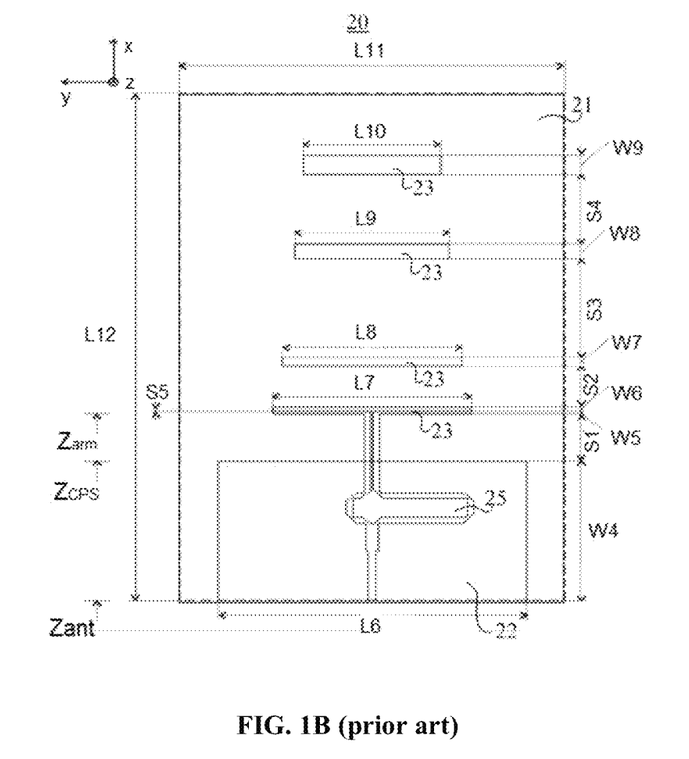
FIG. 1B is a diagram of an edge antenna 20.

Referring to FIG. 1A, FIG. 1A is a diagram of an edge antenna 10. In some embodiments, the edge antenna 10 may be a Yagi-Uda antenna, including a substrate 11, a reflector 12, a director 13, a microstrip feed 14 and so on. FIG. 1B is a diagram of an edge antenna 20. The edge antenna 20 may be a wideband Yagi antenna, including a substrate 21, a ground plane 22, a director 23 and a transmission line type Balun 25. In the edge antennas 10 and 20 as shown in FIG. 1A and FIG. 1B, structures such as the reflector, the director and the Balun increase an area of the edge antenna, thereby increasing packaging cost of the antenna, and a volume and an area of the packaged antenna, which hardly meets industrial design requirements of miniaturization and slimness of mobile terminals.

Therefore, embodiments of the present disclosure provide an antenna unit. The antenna unit as an edge antenna not only greatly reduces the volume and area of the edge antenna, but also achieves wideband matching with a transceiver chip.

Figure 2:
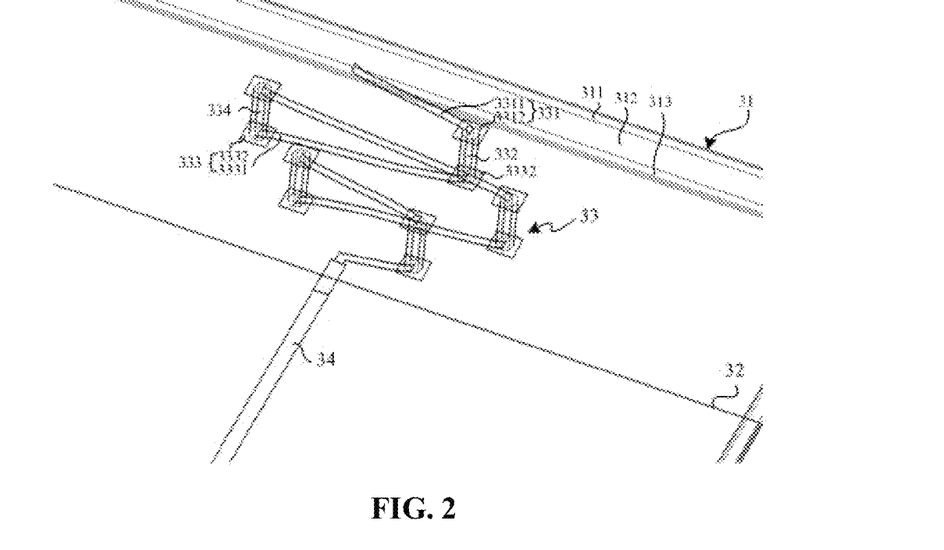
FIG. 2 is a structural diagram of an antenna unit 30 according to an embodiment.

Referring to FIG. 2, FIG. 2 is a structural diagram of an antenna unit 30 according to an embodiment. The antenna unit 30 may include a helical antenna 33 with a three-dimensional structure, wherein the helical antenna 33 is disposed on an edge region of a carrier board 31, and includes at least one turn of helical coil, wherein each of the at least one turn of helical coil includes a plurality of helical segments that are not in a same plane, and the plurality of helical segments are respectively disposed in a plurality of layers of the carrier board 31.

In some embodiments, the carrier board 31 includes at least two metal layers 311 and 313 and a non-conductive dielectric layer 312 between the two metal layers, and each of the at least one turn of helical coil includes a first helical segment 331, a second helical segment 332, a third helical segment 333 and a fourth helical segment 334 which are connected in series, wherein the first helical segment 331 and the third helical segment 333 are respectively disposed in the at least two metal layers 311 and 313 along a direction parallel to a plane of the carrier board 31, and the second helical segment 332 and the fourth helical segment 334 penetrate through the non-conductive dielectric layer 312 along a thickness direction of the carrier board 31 to electrically connect the first helical segment 331 and the third helical segment 333.

In some embodiments, the helical antenna 33 may include merely one turn of helical coil.

In some embodiments, the carrier board 31 merely includes two metal layers, the first metal layer 311 and the second metal layer 313. The helical antenna 33 includes a plurality of turns of helical coil, where a plurality of first helical segments 331 of the plurality of turns of helical coil are disposed in the first metal layer 331, a plurality of second helical segments 332 of the plurality of turns of helical coil are disposed in the second metal layer 313, and one or more non-conductive dielectric layers are disposed between the first metal layer 311 and the second metal layer 313.

Alternatively, in some embodiments, the carrier board includes a plurality of non-conductive dielectric layers and a plurality of metal layers alternately stacked along the thickness direction of the carrier board, the helical antenna includes a plurality of turns of helical coil, a plurality of first helical segments of the plurality of turns of helical coil are disposed in a same metal layer or different metal layers, a plurality of second helical segments of the plurality of turns of helical coil are disposed in a same metal layer or different metal layers, and the second helical segments and the fourth helical segment penetrate through one or more layers between the first helical segment and the third helical segment which segments are electrically connected with the second and fourth helical segments. It could be understood that, when the carrier board includes a plurality of non-conductive dielectric layers and a plurality of metal layers, segments of the helical antenna may be designed flexibly in various ways which are not listed in detail here. In practice, the segments of the helical antenna can be designed according to performance to be achieved by the antenna.

In some embodiments, the first helical segment 331 may be disposed in a top metal layer of the carrier board 31, and the second helical segment 332 may be disposed in a bottom metal layer of the carrier board 31. Alternatively, the first helical segment 331 and the second helical segment 332 may be respectively disposed in different middle metal layers of the carrier board 31.

In some embodiments, the first helical segment 331 includes a radiation arm 3311, the third helical segment 333 includes a radiation arm 3331, and each of the second helical segment 332 and the fourth helical segment 334 includes a through hole or a via filled with a conductive material, wherein two ends of the through hole or the via of the second helical segment 332 are electrically connected to the radiation arm 3311 of the first helical segment 331 and the radiation arm 3331 of the third helical segment 333, and an end of the through hole or the via of the fourth helical segment 334 is electrically connected to the radiation arm 3331 of the third helical segment 333, so as to form one turn of helical coil. In some embodiments, the radiation arms may be traces formed by a process such as deposition or etching.

In some embodiments, the first helical segment 331 further includes one solder pad 3312 which is electrically connected to at least one end of the corresponding radiation arm 3311, the third helical segment 333 further includes two solder pads 3332 which are electrically connected to two ends of the corresponding radiation arm 3331, two ends of the through hole or the via of the second helical segment 332 are electrically connected to the solder pad 3312 of the first helical 331 segment and the solder pad 3332 of the third helical segment 333, and an end of the through hole or the via of the fourth helical segment 334 is electrically connected to the solder pad 3332 of the third helical segment 333 and a solder pad 3312 of a first helical segment 331 in a next turn of helical coil.

In some embodiments, the first helical segment 331 and the third helical segment 332 are curved or linear. In some embodiments, the first helical segment 331 and the third helical segment 332 are in a shape of a trigonometric function curve or a logarithmic function curve. The shape of a continuous and smooth function curve is beneficial to achieve impedance matching between the helical antenna 33 and a transceiver chip (TRX RFIC).

In some embodiments, an angle between projections of the first helical segment 331 and the third helical segment 333 on the plane of the carrier board 31 is an acute angle, which is beneficial to reduce an area of the helical antenna 33. The first helical segment 331 and the third helical segment 333 whose projections on different layers of the carrier board 31 form an acute angle are prone to be made by processes.

In some embodiments, the helical antenna 33 works in an axial radiation mode, or a mixed radiation mode of a normal radiation mode and an axial radiation mode, wherein in the axial radiation mode, the helical antenna 33 has largest radiation intensity in an axial direction of the helical antenna, and in the normal radiation mode, the helical antenna 33 has largest radiation intensity in a direction perpendicular to the axial direction of the helical antenna 33.

A working mode of the helical antenna 33 is determined by its structural parameters. When a helical radius of the helical antenna 33 is much smaller than working wavelength $\lambda_0$ of the helical antenna 33, the helical antenna 33 is similar to an electric dipole and works in the normal radiation mode. To achieve lateral coverage of radiated signals, in some embodiments, an axis of the helical antenna 33 may be set to point to a normal direction of a boundary of the carrier board in the edge region where the helical antenna is located, and the helical antenna 33 may be enabled to work in the axial radiation mode. To excite the axial radiation mode of the helical antenna 33, the parameters of the plurality of turns of helical coil of the helical antenna 33 may be set to satisfy following conditions: $3/4 < C/\lambda_0 < 4/3$, $S \approx \lambda_0/4$, $N \geq 3$, where C is circumference of a projection of each turn of helical coil on a plane perpendicular to an axis of the helical antenna 33, S is an interval between the turns of helical coil, N is the number of the plurality of turns of helical coil, and $\lambda_0$ is working wavelength of the helical antenna 33. For example, a center frequency of the working bandwidth of the helical antenna 33 is 26.75 GHz, and $\lambda_0$ may be 11.2 mm.

It should be noted that the above parameters define the circumference C of the projections of each turn of the helical coil. In other embodiments, C may be converted into a radius r of each turn of helical coil, and the radius r of each turn of helical coil replaces the circumference C as one of the structural parameters for structural design of the helical antenna 33.

In some embodiments, the helical antenna 33 includes a plurality of turns of helical coil, and the plurality of turns of helical coil have different helical radii. Referring to FIG. 2, in some embodiments, a change trend of the helical radii of the plurality of turns of helical coil includes: the helical radii of the helical coils in two end regions of the carrier board 31 being smaller than the helical radii of the helical coils in a middle region of the carrier board 31. The change trend of the helical radii of the plurality of turns of helical coil can be used for adjusting wideband impedance matching and a radiation direction gain of the helical antenna 33. In other embodiments, the helical radii of the plurality of turns of helical coil may have a change trend different from that in FIG. 2.

Considering a balance between performance and size, in some embodiments, it is more practical to make the helical antenna 33 work in a mixed radiation mode. Accordingly, an interval between adjacent turns of helical coil of the helical antenna 33 is relatively small, and the radii of the plurality of turns of helical coil change.

In some embodiments, a first antenna array (not shown in FIG. 2) is disposed in a middle region of the carrier board 31, and includes a plurality of patch units, and a maximum value of the helical radii of the plurality of turns of helical coil is smaller than or equal to a size of one patch unit.

In some embodiments, the helical antenna 33 may be disposed in the edge region of one side of the carrier board 31, or may be arranged in the edge region of multiple sides of the carrier board 31. For example, the carrier board 31 may be rectangular, and the helical antenna 33 may be disposed in the edge region parallel to three sides of the carrier board 31.

In some embodiments, the carrier board 31 further includes one or more ground planes 32 on a plane along its thickness direction, wherein the one or more ground planes 32 cover the middle region of the carrier board 31 to expose the edge region of the carrier board 31.

In some embodiments, the antenna unit 30 further includes a microstrip feed 34 disposed in the middle region of the carrier board 31, wherein a feed end of the microstrip feed 34 is electrically connected to a first end of the helical antenna 33, and a second end of the helical antenna 33 is a free end configured to radiate signals.

Compared with the edge antennas 10 and 20 in FIG. 1A and FIG. 1B, the antenna unit 30 in the embodiment as shown in FIG. 2 saves a director and a reflector, thereby reducing a size of the antenna and an area and a volume of the AiP, saving wideband matching balun, being easy to connect with the transceiver chip (TRX RFIC), having a small area, good wideband matching characteristic and large working bandwidth, and a maximum radiation gain pointing to the side of the carrier board and cooperating with the main antenna array to cover an entire sector.

Figure 3:
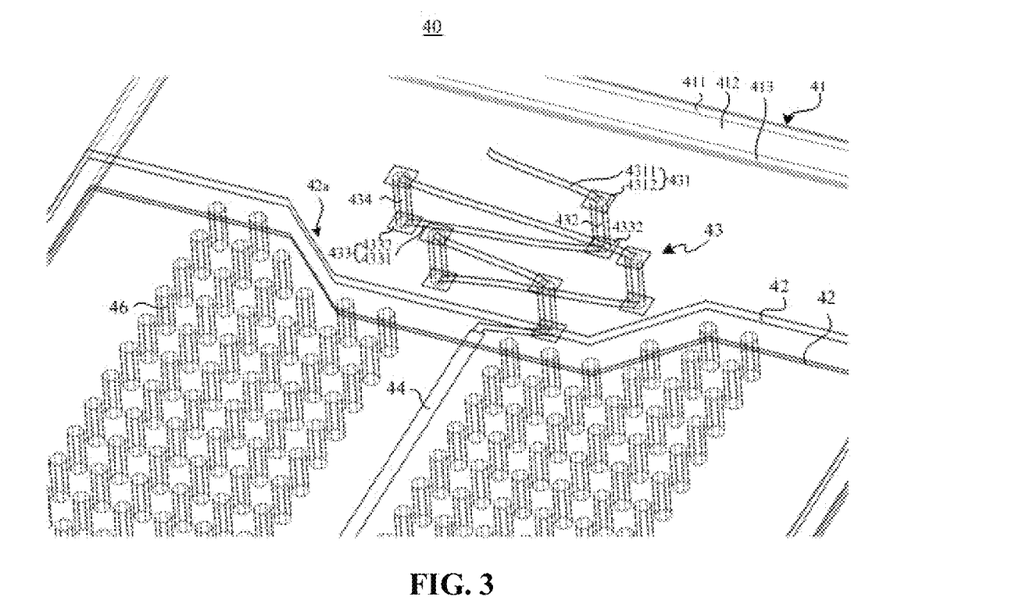
FIG. 3 is a structural diagram of an antenna unit 40 according to an embodiment.

Referring to FIG. 3, FIG. 3 is a structural diagram of an antenna unit 40 according to an embodiment. The antenna unit 40 may include a helical antenna 43 with a three-dimensional structure and a microstrip feed 44, wherein the helical antenna 43 is disposed on an edge region of a carrier board 41, a feed end of the microstrip feed 44 is electrically connected to a first end of the helical antenna 43, and a second end of the helical antenna 43 is a free end configured to radiate signals.

The helical antenna 43 includes at least one turn of helical coil, and the carrier board 41 includes at least two metal layers 411 and 413 and a non-conductive dielectric layer 412 between the two metal layers. Each of the at least one turn of helical coil includes a first helical segment 431, a second helical segment 432, a third helical segment 433 and a fourth helical segment 434 which are connected in series, wherein the first helical segment 431 and the third helical segment 433 are respectively disposed in the at least two metal layers 411 and 413 along a direction parallel to a plane of the carrier board 41, and the second helical segment 432 and the fourth helical segment 434 penetrate through the non-conductive dielectric layer 412 along a thickness direction of the carrier board 41 to electrically connect the first helical segment 431 and the third helical segment 433.

In some embodiments, the carrier board 41 further includes one or more ground planes 42 which cover the middle region of the carrier board 41 to expose the edge region of the carrier board 41. The one or more ground planes 42 are electrically connected via contact holes 46 that penetrate the carrier board 41 along a thickness direction of the carrier board 41.

Differences between the embodiment as shown in FIG. 3 and the embodiment as shown in FIG. 2 lie in that a notch 42a retracted toward the middle region of the carrier board 41 is formed on the one or more ground planes near the edge region of the carrier board 41, and a portion of the helical antenna 43 is disposed in the carrier board 41 exposed by the notch 42a. Specifically, the notch 42a may be trapezoidal.

If an area of the chip permits, as shown in FIG. 3, a multi-layer connected ground plane may be used and a notch with a certain shape is cut at an edge of the ground plane to retract the helical antenna 43 into the notch, thereby reducing length of the helical antenna 43 extending out of the edge of the carrier board 41 so as to reduce a package size and further better control directions and gains of beams.

Figure 4:
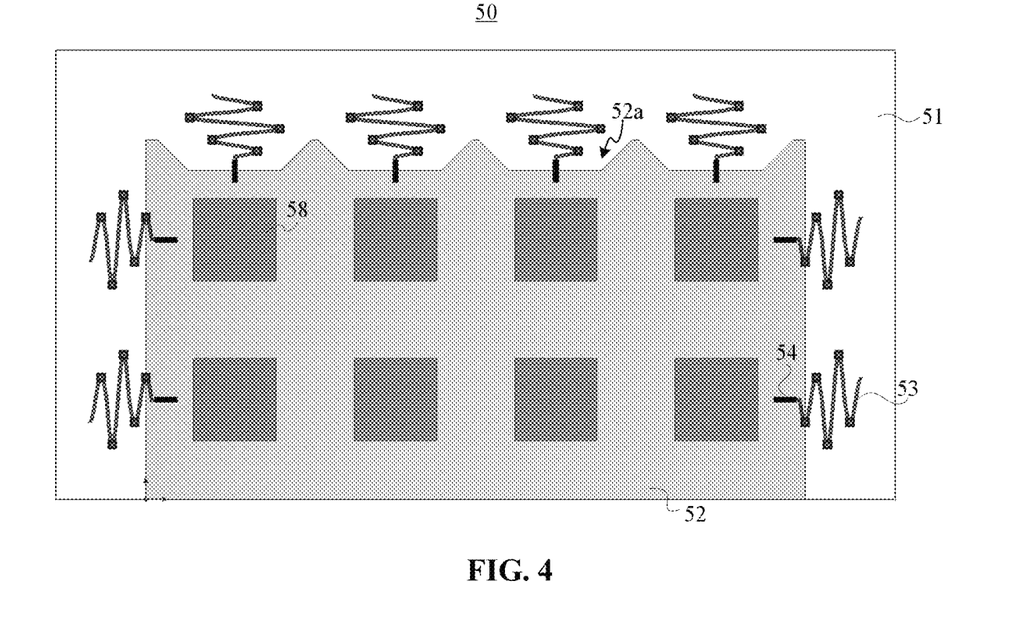
FIG. 4 is a structural diagram of an antenna system 50 according to an embodiment.

Embodiments of the present disclosure further provide an antenna system. FIG. 4 is a structural diagram of an antenna system 50 according to an embodiment. In some embodiments, the antenna system 50 includes a carrier board 51, a first antenna array and a second antenna array, wherein the first antenna array is disposed in a middle region of the carrier board 51 and includes a plurality of patch units 58, and the second antenna array is disposed at an edge region of the carrier board 51 and includes at least one above antenna unit. The antenna unit may include a helical antenna 53 and a microstrip feed 54, wherein the helical antenna 53 is disposed on an edge region of the carrier board 51, the microstrip feed 54 is disposed on the middle region of the carrier board 51, one end of the microstrip feed 54 is electrically connected to the helical antenna 53, and the other end of the microstrip feed 54 is electrically connected to a transceiver chip.

In some embodiments, the second antenna array of the antenna system 50 may include a plurality of antenna units. The carrier board 51 may be rectangular, and the plurality of antenna units may be disposed in the edge region of the carrier board 51 along directions parallel to three sides of the rectangle. The carrier board 51 may be a package substrate or a PCB.

In some embodiments, the plurality of patch units 58 are disposed along a direction parallel to a plane of the carrier board 51, a maximum gain of radiation of the patch units 58 points to a direction perpendicular to the plane of the carrier board 51, an axis of the helical antenna 53 of the plurality of antenna units is arranged in the direction parallel to the plane of the carrier board 51, and a maximum gain of radiation of the plurality of antenna units points to an axial direction of the helical antenna 53.

In some embodiments, a radiation beam distribution range of the first antenna array includes a sector between −60° and 60° on a radiation plane perpendicular to the plane of the carrier board 51, a radiation beam distribution range of the second antenna array includes a sector between 60° and 120° on the radiation plane perpendicular to the plane of the carrier board 51. The radiation plane may be a cross section formed by longitudinally cutting the carrier board 51 in a direction parallel to a long side of the rectangular carrier board 51.

In the antenna system 50 as shown in FIG. 4, the first antenna array can be regarded as the main antenna, and the second antenna array is the edge antenna. As the main antenna and the edge antenna work in different radiation mode, the edge antenna can compensate insufficient lateral beam coverage of the main antenna.

Figure 5:
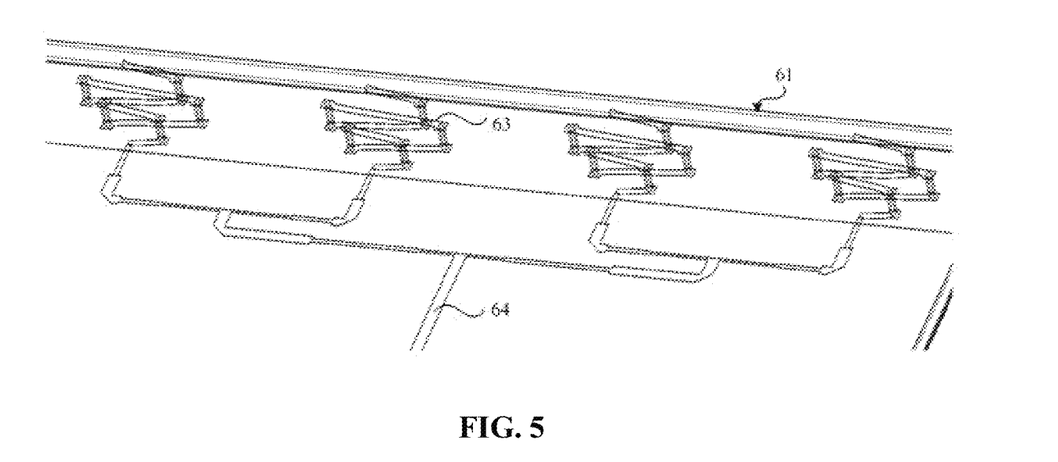
FIG. 5 is a structural diagram of a second antenna array according to an embodiment.

FIG. 5 is a structural diagram of a second antenna array according to an embodiment.

In some embodiments, the second antenna array may include a plurality of helical antennas 63 arranged in a one-dimensional array at the edge region of the carrier board 61. The plurality of helical antennas 63 may share a microstrip feed 64 which has a plurality of feed ends electrically connected to the plurality of helical antennas 63, respectively.

Figure 6:
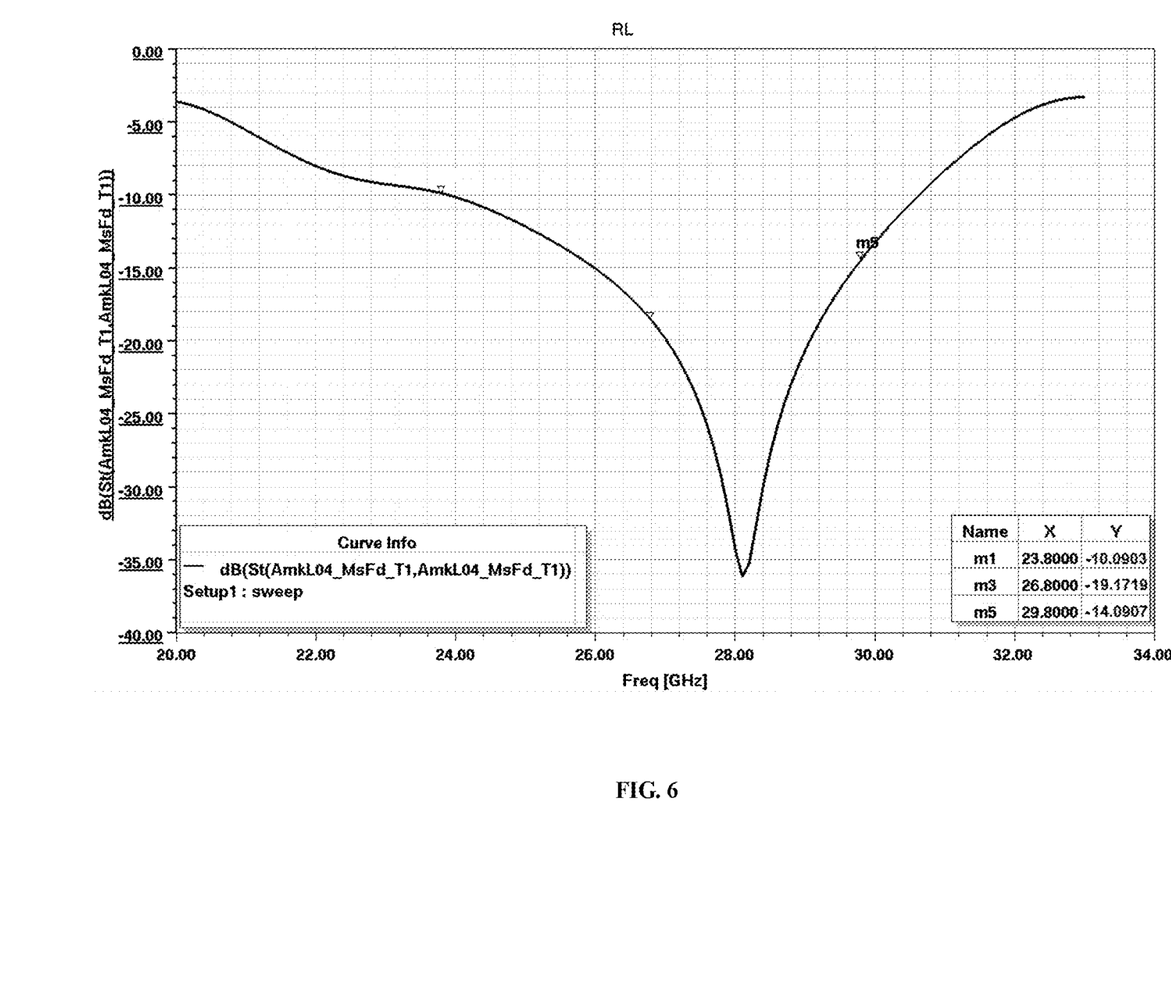
FIG. 6 is a diagram of impedance characteristic of the second antenna array as shown in FIG. 5.
Figure 7:
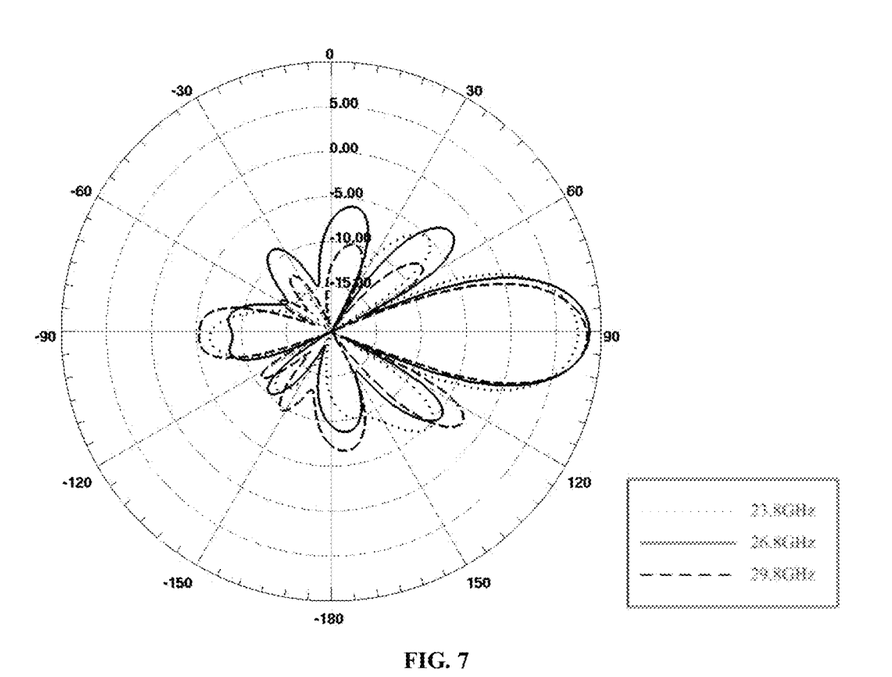
FIG. 7 is a diagram of E-plane radiation directivity of the second antenna array as shown in FIG. 5 at frequencies 23.8 GHz, 26.8 GHz and 29.8 GHz.
Figure 8:
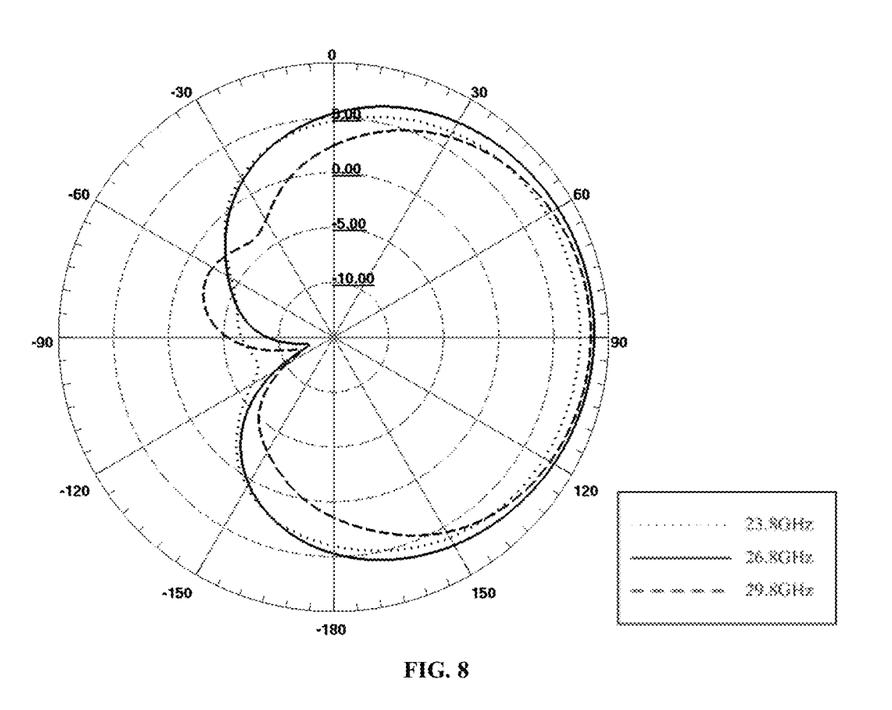
FIG. 8 is a diagram of H-plane radiation directivity of the second antenna array as shown in FIG. 5 in at frequencies 23.8 GHz, 26.8 GHz and 29.8 GHz.

Referring to FIG. 6 to FIG. 8, FIG. 6 is a diagram of impedance characteristic of the second antenna array as shown in FIG. 5, where a horizontal axis represents return loss/dB, and a vertical axis represents frequency/GHz, FIG. 7 is a diagram of E-plane radiation directivity of the second antenna array as shown in FIG. 5 at frequencies 23.8 GHz, 26.8 GHz and 29.8 GHz, and FIG. 8 is a diagram of H-plane radiation directivity of the second antenna array as shown in FIG. 5 at frequencies 23.8 GHz, 26.8 GHz and 29.8 GHz.

As the helical antenna 63 in an axial mode generally has relatively wide working bandwidth, wideband matching between the helical antenna 63 and the microstrip feed 64 can be realized by optimizing the design of the helical antenna 63. As shown in FIG. 6, a working frequency band below −10 dB is from 24 GHz to 29.5 GHz, impedance bandwidth is 5.5 GHz, a center frequency is 26.75 GHz, and a bandwidth ratio is 20%. Therefore, without any additional matching circuit, the working bandwidth of the second antenna array can cover entire N258 and N257 frequency bands.

In other embodiments, the working frequency band of the helical antenna 63 may be a millimeter wave frequency band with a preset bandwidth between 24 GHz and 300 GHz, for example, such as 24 GHz to 29.5 GHz, 37 GHz to 42.5 GHz, or 57 GHz to 71 GHz.

It can be seen from the E-plane radiation pattern shown in FIG. 7 that after deducting a feed network and various material losses, the second antenna array achieves a gain of 8 dB to 10 dB in the frequency band of 24 GHz to 29.5 GHz, that is, a gain of each antenna unit in this frequency band is higher than 3 dB to 4 dB, and also higher than 2.18 dBi of an ideal dipole. In addition, a radiation beam distribution range of the second antenna array includes a sector between 60° and 120° in the E-plane, and its maximum gain direction is 90°, i.e., the axial direction of the helical antenna 63, which meets an expected coverage of the edge antenna and can compensate directions outside the maximum working angle of the main antenna array.

In the H-plane radiation pattern shown in FIG. 8, a radiation beam distribution range of the second antenna array includes a sector between 60° and 120°.

Figure 9:
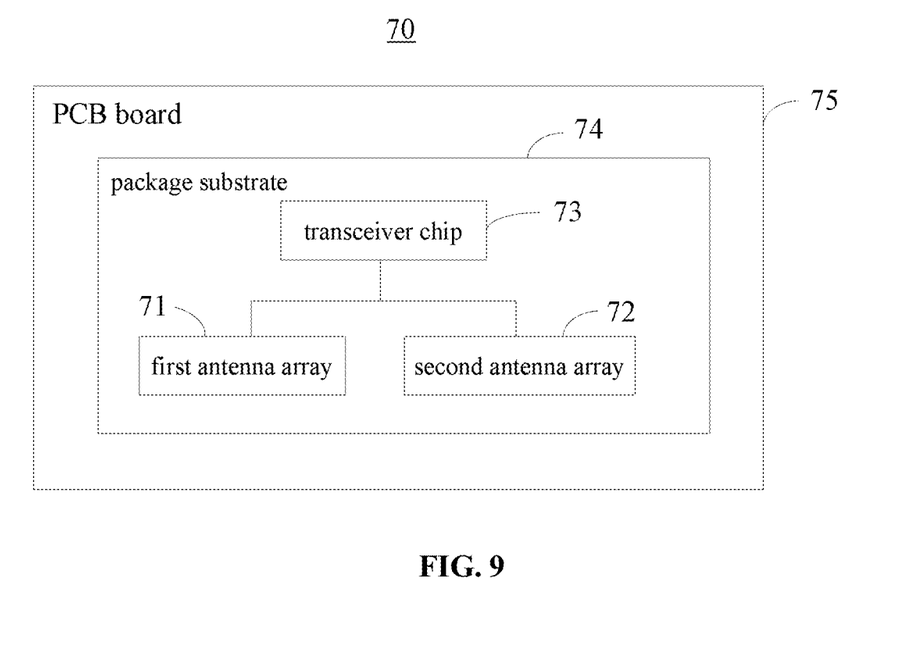
FIG. 9 is a structural diagram of an antenna system 70 according to an embodiment.

FIG. 9 is a structural diagram of an antenna system 70 according to an embodiment.

In some embodiments, the antenna system 70 may include a first antenna array 71, a second antenna array 72, a transceiver chip 73, a package substrate 74 and a PCB 75. The first antenna array 71 is disposed in a middle region on a first surface of the package substrate 74 and includes a plurality of patch units. The second antenna array 72 includes at least one above antenna unit and a microstrip feed, where the helical antenna of the antenna unit is disposed in an edge region on the first surface of the package substrate 74, and the microstrip feed is disposed in the middle region on the first surface of the package substrate 74. The transceiver chip 73 is electrically connected to the first antenna array 71 and the second antenna array 72, respectively, and configured to receive and transmit signals in a preset frequency range. The first antenna array 71, the second antenna array 72, the transceiver chip 73 and the package substrate 74 form an AiP structure which is integrated on the PCB. The PCB may be installed in a terminal and connected with other components.

In some embodiments, the transceiver chip includes a transceiver peripheral circuit and a Radio Frequency Integrated Circuit (RFIC) chip, and is configured to receive and transmit millimeter wave signals with preset bandwidth between 24 GHz and 300 GHz. The transceiver peripheral circuit may include a filter circuit, a coupling circuit and so on.

Figure 10:
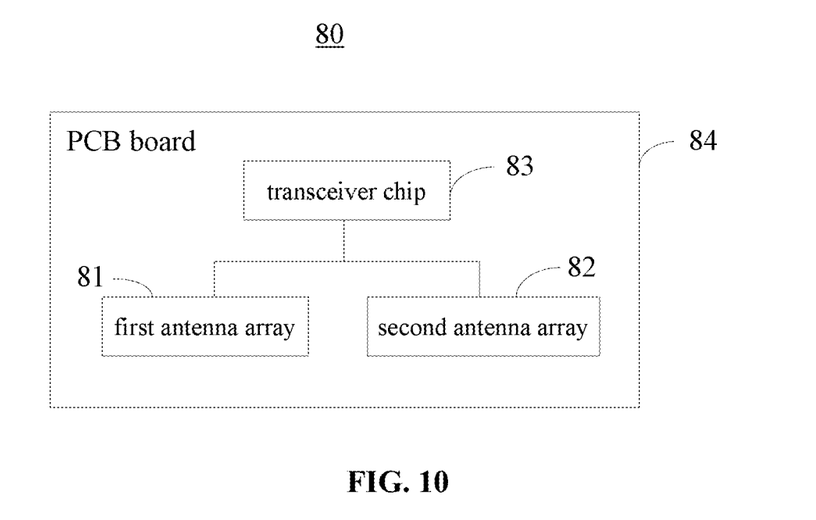
FIG. 10 is a structural diagram of an antenna system 80 according to an embodiment.

FIG. 10 is a structural diagram of an antenna system 80 according to an embodiment.

In some embodiments, the antenna system 80 may include a first antenna array 81, a second antenna array 82, a transceiver chip 83 and a PCB 84. The first antenna array 81 includes a plurality of patch units, and the second antenna array 82 includes at least one above antenna unit and a microstrip feed. The transceiver chip 83 is configured to receive and transmit signals within a preset frequency range, and is electrically connected to the first antenna array 81 and the second antenna array 82 respectively. The first antenna array 81, the second antenna array 82 and the transceiver chip 83 are all integrated on the PCB 84. The transceiver chip 83 may be integrated on the PCB in a different region with the first antenna array 81 and the second antenna array 82. The PCB may be installed in a terminal and connected with other components.

Figure 11:
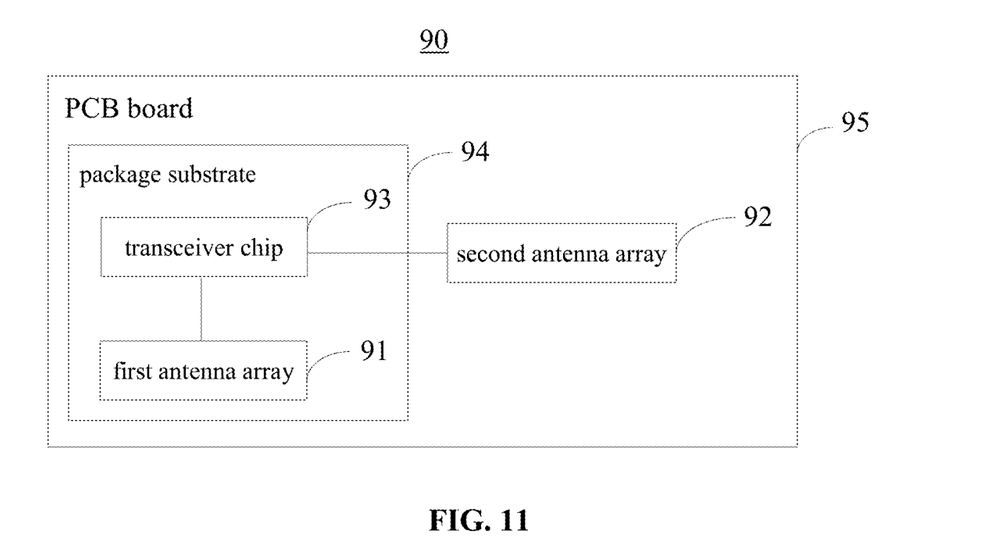
FIG. 11 is a structural diagram of an antenna system 90 according to an embodiment.

FIG. 11 is a structural diagram of an antenna system 90 according to an embodiment.

In some embodiments, the antenna system 90 may include a first antenna array 91, a second antenna array 92, a transceiver chip 93, a package substrate 94 and a PCB 95. The first antenna array 91 includes a plurality of patch units, and the second antenna array 92 includes at least one above antenna unit and a microstrip feed. The transceiver chip 93 is configured to receive and transmit signals within a preset frequency range, and is electrically connected to the first antenna array 91 and the second antenna array 92 respectively. The first antenna array 91 is disposed on a first surface of the package substrate 94, the transceiver chip 93 is disposed on a second surface of the package substrate 94. The first antenna array 91, the transceiver chip 93 and the package substrate 94 form an AiP structure which is integrated on a first region of the PCB 95, and the second antenna array 92 is integrated on a second region of the PCB 95. The PCB may be installed in a terminal and connected with other components.

Figure 12:
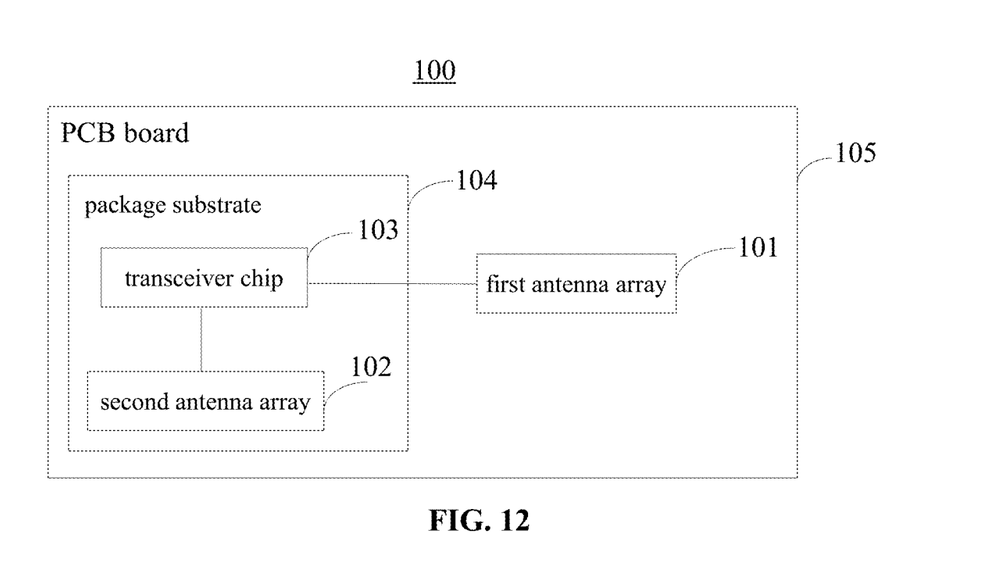
FIG. 12 is a structural diagram of an antenna system 100 according to an embodiment.

FIG. 12 is a structural diagram of an antenna system 100 according to an embodiment.

In some embodiments, the antenna system 100 may include a first antenna array 101, a second antenna array 102, a transceiver chip 103, a package substrate 104 and a PCB 105. The first antenna array 101 includes a plurality of patch units, and the second antenna array 102 includes at least one above antenna unit and a microstrip feed. The transceiver chip 103 is configured to receive and transmit signals within a preset frequency range, and is electrically connected to the first antenna array 101 and the second antenna array 102 respectively. The second antenna array 102 is disposed on a first surface of the package substrate 104, the transceiver chip 103 is disposed on a second surface of the package substrate 104. The second antenna array 102, the transceiver chip 103 and the package substrate 104 form an AiP structure which is integrated on a first region of the PCB 105, and the first antenna array 101 is integrated on a second region of the PCB 105. The PCB may be installed in a terminal and connected with other components.

Embodiments of the present disclosure further provide an electronic device including the above antenna system.

In some embodiments, the electronic device may be a mobile terminal applicable to a 5G New Radio (NR) standard. The mobile terminal includes the antenna system provided in the above embodiments of the present disclosure which is connected to other components in the mobile terminal.

In other embodiments, a working frequency band of the antenna system may be a millimeter wave frequency band with a preset bandwidth between 24 GHz and 300 GHz, for example, such as 24 GHz to 29.5 GHz, 37 GHz to 42.5 GHz, or 57 GHz to 71 GHz.

From above, the antenna unit provided in the embodiments of the present disclosure includes a helical antenna with a three-dimensional structure. The helical antenna is disposed in a plurality of layers of the carrier board rather than in a same plane, which reasonably utilizes a horizontal space and a vertical space of the carrier board, greatly reduces a volume and an area of the antenna unit, so as to meet process design requirements of miniaturization and slimness of mobile terminals.

Further, each of the at least one turn of helical coil includes a first helical segment, a second helical segment, a third helical segment and a fourth helical segment which are connected in series, wherein the first helical segment and the third helical segment are respectively disposed in the at least two metal layers along a direction parallel to a plane of the carrier board, and the second helical segment and the fourth helical segment penetrate through the non-conductive dielectric layer along a thickness direction of the carrier board, that is, the first helical segment and the third helical segment are two planar helical antennas, and the second helical segment extends in a longitudinal direction for electrically connecting the two planar helical antennas. In this way, not only the helical antenna has a three-dimensional structure, but also the planes of the two metal layers are greatly used to set planar helical segments with preset length and preset shapes to realize wideband impedance matching of the helical antenna.

Further, the carrier board includes a plurality of non-conductive dielectric layers and a plurality of metal layers alternately stacked in a thickness direction thereof, the helical antenna includes a plurality of turns of helical coil, a plurality of first helical segments of the plurality of turns of helical coil are disposed in a same metal layer or different metal layers, and a plurality of second helical segments of the plurality of turns of helical coil are disposed in a same metal layer or different metal layers. Therefore, design of segments of each helical coil is flexible in order to adjust performance of the helical antenna.

Further, the first helical segment and the third helical segment may be in a shape of a continuous and smooth function curve such as a trigonometric function or a logarithmic function, which is beneficial to achieve impedance matching between the helical antenna and the transceiver chip.

Further, the antenna unit can work in an axial radiation mode as an edge antenna to cover a space outside a maximum working angle of a main antenna array, so that it can work with the main antenna array to cover the entire sector. Alternatively, the antenna unit can work in a mixed radiation mode of the normal radiation mode and the axial radiation mode, so that it not only can cover the space outside the maximum working angle of the main antenna array, but also a size of the antenna unit is reduced, which reaches a balance between performance of the antenna and the size of the antenna.

Further, the working mode of the antenna unit is determined by structural parameters of the helical antenna, such as a helical circumference of each turn of the helical coil, an interval between the turns of helical coil, and the number of the turns of the helical coil. Specifically, the helical antenna may work in the axial radiation mode or the mixed radiation mode by setting $3/4 < C/\lambda_0 < 4/3$, $S \approx \lambda_0/4$, and $N \geq 3$.

Further, the plurality of turns of helical coil included in the helical antenna may have different helical radii, and a change trend of the helical radii of the plurality of turns of helical coil can be adjusted to adjust wideband impedance matching and a radiation direction gain of the helical antenna.

The antenna system provided in the embodiments of the present disclosure includes a first antenna array and a second antenna array. The first antenna array is arranged in the middle region of the carrier board as a main antenna. The second antenna array includes the antenna unit provided in the embodiments of the present disclosure which is disposed at the edge region of the carrier board as an edge antenna, where the edge antenna covers the space outside the maximum working angle of the main antenna, so that it can cooperate with the main antenna to cover the entire sector. The antenna system further includes a carrier board and a transceiver chip, where the carrier board may include a package substrate or a PCB. In practice, various ways can be used to form a package structure of the antenna, and various ways can also be used to integrate the first antenna array, the second antenna array and the transceiver chip on the PCB.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An antenna unit, comprising a helical antenna with a three-dimensional structure,
wherein the helical antenna is disposed on an edge region of a carrier board, and comprises at least one turn of helical coil, wherein each of the at least one turn of helical coil comprises a plurality of helical segments that are not in a same plane, and the plurality of helical segments are respectively disposed in a plurality of layers of the carrier board,
wherein the carrier board further comprises one or more ground planes, wherein the one or more ground planes cover a middle region of the carrier board to expose the edge region of the carrier board, the one or more ground planes are electrically connected via contact holes that penetrate the carrier board along a thickness direction of the carrier board, a notch retracted toward the middle region of the carrier board is formed on the one or more ground planes near the edge region of the carrier board, and a portion of the helical antenna is disposed in the carrier board exposed by the notch.

2. The antenna unit according to claim 1, wherein the carrier board comprises at least two metal layers and a non-conductive dielectric layer between the two metal layers, and each of the at least one turn of helical coil comprises a first helical segment, a second helical segment, a third helical segment and a fourth helical segment which are connected in series,
> wherein the first helical segment and the third helical segment are respectively disposed in the at least two metal layers along a direction parallel to a plane of the carrier board, and the second helical segment and the fourth helical segment penetrate through the non-conductive dielectric layer along a thickness direction of the carrier board to electrically connect the first helical segment and the third helical segment.

3. The antenna unit according to claim 2, wherein the carrier board comprises a plurality of non-conductive dielectric layers and a plurality of metal layers alternately stacked along the thickness direction of the carrier board, the helical antenna comprises a plurality of turns of helical coil, a plurality of first helical segments of the plurality of turns of helical coil are disposed in a same metal layer or different metal layers, and a plurality of second helical segments of the plurality of turns of helical coil are disposed in a same metal layer or different metal layers.

4. The antenna unit according to claim 2, wherein each of the first helical segment and the third helical segment comprises a radiation arm, and each of the second helical segment and the fourth helical segment comprises a through hole or a via filled with a conductive material, wherein two ends of the through hole or the via of the second helical segment are electrically connected to the radiation arm of the first helical segment and the radiation arm of the third helical segment, and an end of the through hole or the via of the fourth helical segment is electrically connected to the radiation arm of the third helical segment.

5. The antenna unit according to claim 4, wherein the first helical segment further comprises at least one solder pad which is electrically connected to at least one end of the corresponding radiation arm, the third helical segment further comprises two solder pads which are electrically connected to two ends of the corresponding radiation arm, two ends of the through hole or the via of the second helical segment are electrically connected to one solder pad of the first helical segment and one solder pad of the third helical segment, and an end of the through hole or the via of the fourth helical segment is electrically connected to the other solder pad of the third helical segment.

6. The antenna unit according to claim 1, wherein the helical antenna comprises a plurality of turns of helical coil, and the plurality of turns of helical coil have different helical radii.

7. The antenna unit according to claim 6, wherein a change trend of the helical radii of the plurality of turns of helical coil comprises: the helical radii of the helical coils in two end regions of the carrier board being smaller than the helical radii of the helical coils in a middle region of the carrier board.

8. The antenna unit according to claim 1, further comprising a microstrip feed disposed in a middle region of the carrier board,
> wherein a feed end of the microstrip feed is electrically connected to a first end of the helical antenna, and a second end of the helical antenna is a free end configured to radiate signals.

9. An antenna system, comprising a carrier board, a first antenna array and a second antenna array,
> wherein the first antenna array is disposed in a middle region of the carrier board and comprises a plurality of patch units,
> the second antenna array comprises at least one antenna unit according to claim 1, and the helical antenna of the antenna unit is disposed at the edge region of the carrier board.

10. The antenna system according to claim 9, wherein the plurality of patch units are disposed along a direction parallel to a plane of the carrier board, a maximum gain of radiation of the patch units points to a direction perpendicular to the plane of the carrier board, an axis of the helical antenna of the at least one antenna unit is arranged in the direction parallel to the plane of the carrier board, and a maximum gain of radiation of the antenna unit points to an axial direction of the helical antenna.

11. The antenna system according to claim 10, wherein the second antenna array comprises a plurality of antenna units arranged in a one-dimensional array on the carrier board, a radiation beam distribution range of the first antenna array comprises a sector between −60° and 60° on a radiation plane perpendicular to the plane of the carrier board, and a radiation beam distribution range of the second antenna array comprises a sector between 60° and 120° on the radiation plane perpendicular to the plane of the carrier board.

12. The antenna system according to claim 9, further comprising a transceiver chip electrically connected to the first antenna array and the second antenna array and configured to receive and transmit signals in a preset frequency range.

13. The antenna system according to claim 12, wherein the carrier board comprises a package substrate.

14. The antenna system according to claim 13, further comprising a Printed Circuit Board (PCB),
> wherein the first antenna array and the second antenna array are disposed on a first surface of the package substrate, the transceiver chip is disposed on a second surface of the package substrate, and the package substrate carrying the first antenna array, the second antenna array and the transceiver chip is integrated on the PCB.

15. The antenna system according to claim 13, further comprising a PCB,
> wherein the first antenna array is disposed on a first surface of the package substrate, the transceiver chip is disposed on a second surface of the package substrate, the package substrate carrying the first antenna array and the transceiver chip is integrated on a first region of the PCB, and the second antenna array is integrated on a second region of the PCB.

16. The antenna system according to claim 13, further comprising a PCB,
> wherein the second antenna array is disposed on a first surface of the package substrate, the transceiver chip is disposed on a second surface of the package substrate, the package substrate carrying the second antenna array and the transceiver chip is integrated on a first region of the PCB, and the first antenna array is integrated on a second region of the PCB.

17. An electronic device, comprising the antenna system according to claim 9.

18. The antenna unit according to claim 1, wherein the antenna unit works in an axial radiation mode, or a mixed radiation mode of a normal radiation mode and an axial radiation mode, wherein in the axial radiation mode, the antenna unit has largest radiation intensity in an axial direction of the helical antenna, and in the normal radiation mode, the antenna unit has largest radiation intensity in a direction perpendicular to the axial direction of the helical antenna.

19. The antenna unit according to claim 18, wherein the helical antenna comprises a plurality of turns of helical coil, and parameters of the plurality of turns of helical coil satisfy following conditions:

$$3/4 < C/\lambda_0 < 4/3, S \approx \lambda_0/4, N \geq 3,$$

where C is circumference of a projection of each turn of helical coil on a plane perpendicular to an axis of the helical antenna, S is an interval between the turns of helical coil, N is the number of the plurality of turns of helical coil, and $\lambda_0$ is working wavelength of the helical antenna.

* * * * *